US012637587B2

(12) United States Patent (10) Patent No.: US 12,637,587 B2
Sarsanedas Gimpera et al. (45) Date of Patent: May 26, 2026

(54) SELF-DISINFECTING COATING FOR SURFACES

(71) Applicant: DRYLYTE, S.L., Barcelona (ES)

(72) Inventors: Marc Sarsanedas Gimpera, Barcelona (ES); Marc Soto Hernandez, Barcelona (ES)

(73) Assignee: DRYLYTE, S.L., Barcelona (ES)

( * ) Notice: Subject to any disclaimer, the term of this patent is extended or adjusted under 35 U.S.C. 154(b) by 734 days.

(21) Appl. No.: 18/011,228

(22) PCT Filed: Jun. 15, 2021

(86) PCT No.: PCT/ES2021/070437
§ 371 (c)(1),
(2) Date: Dec. 19, 2022

(87) PCT Pub. No.: WO2021/255309
PCT Pub. Date: Dec. 23, 2021

(65) Prior Publication Data
US 2023/0250313 A1 Aug. 10, 2023

(30) Foreign Application Priority Data

Jun. 19, 2020 (ES) .................................. 202030601

(51) Int. Cl.
| | |
|---|---|
| *C09D 189/00* | (2006.01) |
| *C09D 5/14* | (2006.01) |
| *C09D 105/00* | (2006.01) |
| *C09D 189/06* | (2006.01) |
| *C09D 201/04* | (2006.01) |

(52) U.S. Cl.
CPC ............. *C09D 189/06* (2013.01); *C09D 5/14* (2013.01); *C09D 105/00* (2013.01); *C09D 201/04* (2013.01)

(58) Field of Classification Search
CPC ...... C09D 189/06; C09D 5/14; C09D 105/00; C09D 201/04
USPC ...................................................... 106/135.1
See application file for complete search history.

(56) References Cited

U.S. PATENT DOCUMENTS

| | | | |
|---|---|---|---|
| 2006/0163083 A1 | 7/2006 | Andricacos et al. | |
| 2007/0104766 A1 | 5/2007 | Wang et al. | |
| 2007/0166344 A1* | 7/2007 | Qu .......................... | A61L 31/10 424/405 |
| 2010/0303723 A1 | 12/2010 | Farokhzad et al. | |
| 2011/0111000 A1 | 5/2011 | Russell et al. | |
| 2011/0124772 A1 | 5/2011 | Wang et al. | |
| 2015/0359945 A1* | 12/2015 | Rosenblatt .............. | A61L 31/10 424/404 |
| 2016/0221146 A1 | 8/2016 | Lugg et al. | |
| 2018/0207122 A1 | 7/2018 | Scholz et al. | |

FOREIGN PATENT DOCUMENTS

| | | |
|---|---|---|
| CN | 101374607 A | 2/2009 |
| CN | 102665734 A | 9/2012 |
| CN | 106538583 A | 3/2017 |
| WO | 2008005164 A1 | 1/2008 |

OTHER PUBLICATIONS

Int'l Search Report for PCT/ES2021/070437, dated Jul. 27, 2021.
"Journal Of Chromatography, Including Electrophoresis and Other Separation Methods", vol. 602, Nos. 1 &2, Jun. 5, 1992, pp. 1-150.
"Journal Of Chromatography, Including Electrophoresis and Other Separation Methods", vol. 602, Nos. 1 &2, Jun. 5, 1992, pp. 151-294.

* cited by examiner

*Primary Examiner* — James E Mcdonough
(74) *Attorney, Agent, or Firm* — Edell, Shapiro & Finnan, LLC

(57) ABSTRACT
A self-disinfecting coating (1) for surfaces: is provided that includes a base matrix (2) and a loading solution (3), the matrix (2) in turn includes a gel base (10) and a gel fluid (7), and the loading solution (3) comprises an active disinfectant ingredient (4), in such a way that the base matrix (2) is able to absorb and retain the active ingredient (4) while maintaining, on the free surface of the coating (1), a sufficient concentration of active ingredient (4), thus maintaining the surface disinfected. The gel base (10) may include a protein of collagen, albumin or elastin and glycerine as the plasticising agent (6). The loading solution (3) may include elemental iodine as an active ingredient (4) and ethanol as the loading solvent (8). The self-disinfecting coating (1) may include a base substrate (11) that includes therein the base matrix (2) and loading solution (3).

18 Claims, No Drawings

SELF-DISINFECTING COATING FOR SURFACES

BACKGROUND OF THE INVENTION

Today, there is an evident need to prevent the spread of pathogenic agents, such as bacteria, viruses, etc., through contact surfaces. This transmission could be eliminated or reduced if these contact surfaces had disinfecting properties, in other words, if, after contact with pathogenic agents, the surfaces were disinfected autonomously and infections were avoided in future contacts with the surfaces.

There are physical disinfection processes based on increasing temperature or using ultraviolet radiation. However, the most common disinfection process is the use of chemicals. The use of chemical disinfectants is devised for inactivating or destroying inert surface organisms. Among the different types of disinfectants, oxidisers present a broad-spectrum range of action at low concentrations.

Regardless of the action principle, an essential condition for achieving effective disinfection is a sufficient concentration of an active ingredient that is maintained over time.

A disinfecting coating must meet several requirements:
It must withstand daily use of the applied surface
It cannot be toxic or harmful to human skin
It must effectively eliminate pathogenic agents.

There are already solutions for coating surfaces which, for example, react with light and air to produce oxidising conditions on the surface, which are believed to create permanent properties.

Among these permanent solutions, two major categories can be established: those which have an anchored active ingredient, limiting their action strictly to the point of contact, and those which release the active disinfectant ingredient, gradually lowering the concentration of the active ingredient, progressively losing effectiveness as a result.

Due to a simple statistical consideration, this intention to ensure permanent activity has serious drawbacks due to the possibility of some event or damage occurring which negatively modifies the surface.

Moreover, permanent disinfection of a surface is not usually required. For example, during a health crisis, extraordinary temporary disinfection measures are required that are not required in a normal situation.

In this sense, it would be interesting to have a solution for disinfection which could be removed when it is not needed without leaving a trace after the application thereof.

Lastly, it would be interesting to have disinfecting solution that allowed the user to readily discern if there is a sufficient minimum concentration of disinfecting agent on the surface, for example, by means of a colour-based visual indicator, such that the user would know beforehand whether or not the surface is disinfected.

This solution to be applied on surfaces must:
Withstand daily use of the surface
Not be toxic or affect human skin
Maintain a sufficient concentration of active disinfectant ingredient for a specific time
Be easy to remove and not damage the protected surface
Inform the user whether or not the surface is disinfected.

DESCRIPTION OF THE INVENTION

This invention describes a coating for surfaces with disinfecting properties comprising a base matrix able to absorb and dose an active disinfectant ingredient.

In this manner, by means of periodic loading processes of the active disinfectant ingredient, this coating is able to maintain a sufficient minimum concentration of the active disinfectant ingredient on the free surface of the coating, that is, the surface that can be accessible for the user.

The main advantage of this invention is being able to maintain the sufficient minimum concentration of the active disinfectant ingredient based on periodic loads of the active ingredient itself. Periodic loads produce temporary high concentrations of active ingredient in the coating, which is not easy to achieve with solutions that cannot be reloaded. This difference translates into a faster action, since a higher concentration implies more activity, which entails greater protection and safety.

A difference and an advantage of coatings based on this matrix is the fact that they are created on a temporary basis for emergency situations or in times of emergency. For example, at specific times of an epidemic, such as the COVID-19 pandemic, for example, or to reduce the spread of seasonal influenza in places of risk, such as hospitals, homes for the elderly and homes of immunodepressed people. Therefore, this invention is formulated such that it is easy to apply and remove.

This formulation maintains its disinfecting properties, but without being harmful or toxic by means of contact.

Likewise, this matrix is conceived so that it can be applied on surfaces of any type, this matrix is not aggressive nor does it damage the base surface, whether it is made of metal, plastic, or some coating or paint from before. Given its temporary basis, coatings based on this matrix can be readily removed such as, for example, by means of hot water or by peeling.

Similarly, this matrix is applicable to porous surfaces and materials, such as cellulose papers or fabrics. It is thereby possible to generate, for example, rigid sheets or rolls of fabric or paper which can be used as a base and be periodically loaded with disinfecting agent.

Indeed, this is an invention which considerably improves safety during a health emergency, but it allows recovering normalcy once the crisis has passed without leaving a trace.

General Description

This invention describes a self-disinfecting coating (1) for surfaces comprising:
a base matrix (2) comprising
a gel base (10)
a gel fluid (7), and
a loading solution (3) comprising
an active disinfectant ingredient (4),

Numbering (1) Coating
(2) Base matrix
(3) Loading solution
(4) Active disinfectant ingredient
(5) Precursor solution
(6) Plasticising agent
(7) Gel fluid
(8) Loading solvent
(9) Precursor solution solvent
(10) Gel base
(11) Base support of the matrix Performance By way of illustrative example, the invention can work as follows:

A self-disinfecting coating (1) is placed at the points of contact to be protected of a building, room, transport, etc., such as doorknobs and windows, lift buttons, grab bars and railings and others.

For a certain time, as a result of the active disinfectant ingredient (4) present on the free surface of the coating, that is, that surface which is accessible for the user, the pathogenic agents which are deposited on the coating (1) are removed.

Due to contacts and to time, the surface concentration of the active ingredient (4) on the coating, that is, the amount of active ingredient (4) present on the free surface of the coating, decreases. If the surface concentration of the active ingredient (4) in the coating (1) decreases below a value, the disinfection function is not performed correctly.

After the indicated time has passed, for example, at the end of the workday, the loading solution (3) is applied on the coating (1) for the purpose of increasing the surface concentration of the active ingredient (4) again and thus ensuring the required level of disinfection of the surface.

The key and not obvious point of this invention is the capacity to reload the matrix for maintaining a high concentration of active ingredient on the surface. This distinctive feature of the invention represents a previously unknown advantage, since it is precisely this which ensures the presence of active ingredient in high and reliable concentrations on the surfaces to be protected.

As far as the inventors are aware, this is the first description of a coating with disinfecting properties that can be reloaded with a disinfecting agent which ensures the presence of the disinfecting agent in high and reliable concentrations on the surfaces to be protected.

Coating is understood herein as any type of paint, varnish, film, and the like used on a surface to modify its properties.

Base Matrix (2)

The base matrix (2) is a gel-type structure, or a polymer, having internal mobility, whether ionic or molecular.

The IUPAC (International Union of Pure and Applied Chemistry) defines "gel" as a non-fluid colloidal network or polymer network, defined herein as gel base (10), which is completely expanded by a fluid, defined herein as gel fluid (7). The base matrix (2) thus comprises at least one gel base (10) or base colloid or polymer, and a gel fluid (7).

Upon applying the loading solution (3) on the base matrix (2), the active ingredient (4) spreads from the free surface of the coating into the base matrix (2) as a result of this internal mobility allowed by the gel base (10), such that most of the coating acts as a reserve for active ingredient (4) while at the same time part of the active ingredient (4) remains on the free surface of the coating.

During use, the active ingredient (4) is consumed on the free surface of the coating. When this occurs, the concentration of the active ingredient (4) on the part of the base matrix (2) close to the free surface of the coating decreases and is therefore lower than the concentration of the active ingredient of the rest of the base matrix (2). At this time, the active ingredient of the part where there is a higher concentration spreads towards the part where there is a lower concentration, that is, the active ingredient (4) spreads from the inside of the base matrix (2) to the free surface of the coating, such that the concentration of the active ingredient (4) on the free surface of the coating is kept high, ensuring, while there is sufficient active ingredient (4) in the base matrix (2), the disinfecting effect.

The degree of mobility of the active disinfectant ingredient (4) within the base matrix (2) can be regulated by adjusting the composition of the coating with the addition of plasticising agents (6) to the base matrix (2). Generally, the more plasticising agent (6) there is, the more mobility of the active ingredient (4) there will be within the base matrix (2).

The self-disinfecting coating (1) object of the invention can be applied on most commonly used surfaces, such as metals, plastics, woods, other coatings, etc.

Preferably, the self-disinfecting coating (1) object of the invention can be completely removed without leaving a trace, when considered appropriate, by means of simple cleaning methods such as, for example, by means of applying heat (for example, hot water) or peeling. So that the coating can be removed by means of applying heat, for example, by means of applying hot water, the coating must be thermally reversible, such as those coatings based on collagen, for example. So that the coating can be removed by means of peeling, the coating must have an internal cohesion that is greater than the adhesion to the surface, as occurs with most polymer coatings.

The base matrix (2) is one of the key aspects of the invention, and it must preferably meet a series of functions and characteristics defined below:

Absorbing active ingredient (4) on the surface
Retaining the active ingredient (4) therein
Releasing the active ingredient (4) on the surface
Having mechanical stability
Having chemical stability against the active ingredient (4)
Cannot be toxic Finding a solution that meets these requirements a priori is not obvious to a person skilled in the art, as demonstrated by the fact that until now, there have not been any solutions with these features.

In this invention, the gel fluid (7) integrated in the base matrix (2) is what carries out the function of absorbing the active ingredient (4), which spreads across the entire base matrix (2), and acts as a reserve for active ingredient (4) over time. As the active ingredient (4) is gradually consumed on the surface, the active ingredient (4) is gradually replaced on the surface due to the high mobility (molecular or ionic mobility, as the case may be) provided by the gel fluid (7).

Gel Base (10)

Preferably, the base matrix (2) is based on natural or biocompatible components to prevent intrinsic toxicity of the material, such as polysaccharides, polypeptides or proteins, for example.

In an even more preferred embodiment, the base matrix (2) based on natural gels is formed by proteins. Given their availability, animal proteins are preferably used, such as, for example and without limitation, collagen, elastin, albumin.

In the most preferred embodiment, the gel base (10) is based on the protein collagen. Collagen gels, which can be called gelatin, are a colloid gel presenting multiple advantages for this application.

Collagen gel has thermally reversible properties facilitating the application thereof. At temperatures which may vary depending on the formulation, but generally above 60° C., it is liquid phase in the form of a sol-type colloid, having low viscosity, which is advantageous for producing coatings since it allows the appropriate application by means of aerosol. When it cools, however, it generates the colloid in the form of gel. This phase can be formulated by adjusting collagen/fluid proportions and the composition of this fluid (solvents, plasticisers, active ingredient, etc.) such that it produces a suitable matrix in terms of hardness, dry final touch, and mechanical strength. This process is a predominantly thermal process, so it does not need a long drying, such that the time that passes between the application and the final state is shorter than in those cases which are based only on solvent evaporation.

In a second preferred embodiment, the gel base (10) is based on the protein albumin. This protein is rich in sulphide, which provides covalent disulphide bridges suitable for the formation of stable gel structures, combined with reversible hydrogen bridges, which allows a thermal processing. The protein albumin is natural and biodegradable.

In a third preferred embodiment, the gel base (10) is based on a plant polysaccharide, such as a carrageenan, for example, preferably agar-agar. These formulations usually show more viscosity, so they must be applied by brush or roller-type methods. It allows the creation of thicker coatings, which implies greater storage capability of the active ingredient. Moreover, due to it being plant-based, this alternative formulation is of interest for those situations where the use of animal-based products is preferred to be avoided for ethical, religious or other types of reasons. These natural formulations are biodegradable, which is advantageous for the elimination thereof without any problems. A preserving agent can be added to improve the lifetime of the precursor solution, for example, Acticide MBR 1.

In a fourth preferred embodiment, the base (10) includes polyvinyl alcohol, PVA $(CH_2CHOH)_n$, which is a biocompatible synthetic polymer. This formulation also has thermally reversible properties and forms gels having greater structural integrity. Because of that and its relative lower internal molecular mobility, it is suitable for long lasting formulations that are less frequently used and the reloading of which is more spaced out.

In a fifth preferred embodiment, the base (10) includes polymers and copolymers derived from acrylic acid, such as, for example, polyacrylic acid; sodium polyacrylate, potassium polyacrylate and the like; poly(methyl acrylate), poly (methyl methacrylate), sodium polymethacrylate, potassium polymethacrylate and the like, polyacrylamide, polymethacrylamide, among others. These polymers have a high capability of retaining water in their internal structure and can form gel structures with the presence of water or other solvents. Moreover, these polymers have the capability of absorbing ionic charge compared with protein-derived gels due to the presence of high-polarity functional groups. For this reason, these gels are particularly indicated for formulations in which the active ingredient is an ionic compound or a very polar compound. In these cases, the ionic compound would be highly compatible with the matrix and would be highly retained, which would be beneficial for being able to accumulate a larger amount and being able to space out the loading over time.

The structural integrity of these synthetic polymers is greater than the integrity of protein derivatives such as collagen or albumin. For that reason, these polymers are preferably used in formulations conceived for situations experiencing more wear or requiring greater structural strength. For example, polymers of this class can be used in a porous matrix, such as paper or fabric, to form flexible or rigid sheets with self-disinfecting properties.

Gel Fluid (7)

The base matrix (2) also comprises a gel fluid (7). This fluid is a fundamental part of the gel where, by definition, the gel includes not only a gel base (10) (colloid or polymer base) but also includes a gel fluid (7).

The gel fluid must have the capability of dissolving, retaining the active ingredient (4) and keeping it available on the surface.

This gel fluid (7) includes at least one solvent. The gel fluid (7) can include more than one solvent. It can also include salts to modify the properties of the matrix.

The gel fluid (7) must remain stable in the structure of the matrix, to that end, solvents with a relatively low volatility are preferred.

In addition, they cannot be toxic or cause health problems. The formulations of this matrix for being applied as a coating must be respectful with surfaces which, among others, may be plastic and coatings.

Considering these limitations, a preferred solvent for being part of the fluid gel is water. Alternatively, alcohols such as ethanol, propanol, isopropanol, butanol, ethylene glycol, or liquid polymers such as polyethylene glycol, polypropylene glycol, among others, can be used as the solvent preferred for being part of the fluid gel.

The fluid gel can be a mixture of several solvents, such as water and ethanol, for example.

Plasticising Agents (6)

It is possible to control the degree of internal mobility, whether molecular or ionic, of the base matrix (2) of the coating (1) by means of incorporating plasticising agents (6). These plasticising agents (6) increase the mobility of the active ingredient (4) in the gel base (10).

It is preferred, moreover, that the plasticising agents (6) are hygroscopic, therefore the lattice structure permanently ensures a minimum content of water as the structural fluid of the gel. This permanent minimum amount of water in the gel ensures high mobility and spread of the active ingredient (4). The spread of the active ingredient (4) during the loading step is thereby facilitated, the use of the entire thickness of the coating as a reservoir is promoted, and the availability and release of the active ingredient (4) on the contact surface increases.

The effective disinfection time can be adjusted by regulating the initial amount of active ingredient (4) and the amount of plasticising agents (6).

A preferred plasticising agent (6) is glycerine, since it is hygroscopic, non-toxic, miscible in water and compatible with gelatin, in addition to having low volatility.

Some plasticising agents that can be used for this purpose include, but are not limited, glycerine, glycerol, ethylene glycol, diethylene glycol, triethylene glycol, polyethylene glycol, polyethers, phthalate derivatives, adipic derivatives, benzoic acid derivatives, maleic acid derivatives, citric acid derivatives, epoxidised vegetable oils, among others.

Loading Solution (3)

The loading solution (3) is a solution the function of which is to incorporate the active ingredient (4) into the base matrix (2).

The loading solution (3) is characterised by comprising an active ingredient (4).

Usually, the active ingredient is dissolved in a loading solvent (8) which facilitates application of the loading solution. If the active ingredient is liquid, the loading solvent can then be dispensed with.

The loading solution (3) is applied on the base matrix (2), which causes the active ingredient (4) to spread in the gel base (10) of the coating. The loading solvent (8) favours the spread of the active ingredient (4) in the gel base (10). Durante the loading process, part of the loading solvent (8) evaporates.

The loading solution is preferably applied by means of aerosol. This system allows a homogeneous distribution; furthermore, the large surface area of the aerosol microdroplets favours rapid evaporation of the solvent.

Active Ingredient (4)

The disinfecting properties of the coating are achieved by means of an active ingredient (4).

This active ingredient (4) must be able to attack the pathogenic agents. The active ingredient (4) must be found in a sufficient minimum concentration to produce a disinfecting effect, as established for each disinfecting agent by the corresponding institutions, such as the WHO.

Preferably, the active ingredient (4) is a non-selective disinfectant.

Due to its disinfecting power at low concentrations, the oxidising agents are preferably used, such as hydrogen peroxide, organic peroxides, peracids, chlorine and derived ions such as hypochlorite; bromine and bromine-derived ions; iodine and iodine-derived ions, among others.

The active ingredient (4) can also be metals with disinfecting properties, such as silver, in different forms, such as, for example, in the form of salts or in the form of nanoparticles, copper, in copper (I) or copper (II) salts, nanoparticles, as well as many others.

Halogens and derivatives thereof are good candidates as disinfecting agents which, in fact, are found in many applications which eliminate pathogenic agents, such as in water treatment and surface sterilisation. This group includes chlorine and derived ions such as hypochlorite; bromine and bromine-derived ions; iodine and iodine-derived ions.

Preferably used active ingredients (4) are elemental iodine and derived ions such as iodide and triiodide, whether it is free, in the form of salts, coordinated in a polymer or otherwise, for example, elemental iodine, potassium iodide, potassium triiodide, ammonium iodide, ammonium triiodide, among others. Triiodide derivatives can be prepared in situ by mixing elemental iodine with iodide salts. Iodine is an antiseptic agent used in the health field, for disinfection, for water treatment, etc. It is active whether in element form or in the form of triiodide, which is the combined form of elemental iodine with the iodide anion. It is herein understood that the triiodide anion is a derivative of elemental iodine with iodide.

Preferably the active ingredient (4) is iodine. Iodine presents a high solubility in ethanol, but a very low solubility in water. A none too evident aspect of this invention that represents a clear breakthrough is the fact that it is possible to incorporate iodine in a matrix based on collagen and water, with the presence of glycerine, by means of a solution of iodine in ethanol. The solution of iodine and ethanol is applied on the gel, the iodine spreads and the ethanol evaporates partially or completely. This results in a none too evident manner of incorporating elemental iodine in an aqueous matrix in a manner not previously described.

Iodine has a differential characteristic with respect to other active oxidising ingredients which is volatile. This allows successive iodine loads to be applied without accumulating residue.

Effective molecular mobility of iodine in a base gel (10) has been verified since the concentration within the gel gradually decreases. Due to the yellow colours acquired by the load transfer complexes formed by iodine, it is possible to visually assess the concentration of iodine present. The colour of these compounds allows the presence or absence of active ingredient to be controlled visually. This results in matrices with a visual indicator of the state, either active matrix (1) or base matrix (2).

In a preferred conformation, the active ingredient (4) is ammonium iodide. This compound has the advantage, with respect to other iodide salts, of forming in situ by means of aerial oxidation the oxidising agents iodine or triiodide, which can be observed due to their colour. Upon applying ammonium iodide on the inactive coating (2), said ammonium iodide will spread into the coating, and only the fraction closest to the surface would be transformed into iodine or triiodide, both disinfectants. That is possible due to the balance which ammonium maintains with ammonia, which in turn is able to be released in the form of gas, thus shifting the balance.

The active ingredients (4) based on iodine and derived ions are preferred due to their ochre yellow colour. If the base matrix (2) is transparent, as a result of this yellow colour it is possible to know the degree of disinfection of the coating (1). When the coating has an ochre yellow colour, it indicates that the degree of disinfection is high, whereas when the coating has a non-ochre or even transparent yellow colour, it indicates that the degree of disinfection is low.

To improve the indication of the degree of disinfection, it is of interest to add a blue dye to the formulation of the base matrix (10). In this case, if the coating (1) is blue, it indicates that the degree of disinfection is low. Upon applying a loading solution (3) containing an active ingredient (4) with iodine and iodine-derived ions such as triiodide, which is an ochre yellow colour, a green coating (1) is obtained. Over time and use, the concentration of the active ingredient (4) decreases, the coating turns blue, indicating that the degree of disinfection of the coating (1) is low. This indicates the suitable point for reapplying the loading solution (3). This system presents an evident interest, since it allows knowing, at a simple glance, if the surface is safe or if a new load is necessary.

In the event that the active ingredient (4) does not have its own colour, extra indicators can be used, such as, for example, redox indicators, indicating the presence of an oxidising agent.

A preferred class of oxidising agents are peroxides. These compounds characterised by presenting an oxygen-oxygen O—O bond are oxidising compounds that have a disinfecting potential for widespread use in the medical field. Included among these agents are hydrogen peroxide, organic peroxides, and organic peracids.

Loading Solvent (8)

The loading solvent (8) helps to dissolve the active ingredient (4) within the base matrix (2).

The loading solvent (8) must be compatible with the gel fluid (7) of the base matrix (2) and must preferably be more volatile than the gel fluid (7).

The loading solvent (8) can be a single solvent or the mixture of several solvents.

Preferably those solvents that are not toxic or harmful are used as solvents. Preferably, the liquid includes ethanol, since it has a high capability of solubilising active ingredients, presents a volatility that allows for drying in short times, and furthermore has the advantage of not being toxic.

For formulations requiring a very fast drying, the solvent (7) includes acetone, since it has a high volatility.

Precursor Solution (5)

There are different methods of applying at least the base matrix (2) of the coating.

In a preferred embodiment, the base matrix (2) is in the form of a precursor solution (5). This precursor solution (5) comprises at least the gel base (10) and the gel fluid (7). According to the formulation, the precursor solution (5) can include plasticising agents to improve mobility of the active ingredient.

The precursor solution (5) is conceived to be transported and marketed in this state, for which reason it must be stable over time. To that end, although it can include the active ingredient (4) to thereby form the base matrix (2) directly, this can reduce its lifetime. Moreover, many active ingredients (4) are volatile, whereby their concentration cannot be ensured. Therefore, the precursor solution preferably does not include the active ingredient.

Preferably, the precursor solution (5) includes a preferably volatile precursor solution solvent (9), which reduces the viscosity and improves the applicability of the precursor solution (5).

In a preferred formulation, the precursor solution (5) includes the protein collagen, glycerine and water. The optimal glycerine/dry collagen mass ratio is between 5/100 and 30/100, preferably, the glycerine/dry collagen mass ratio is 15/100.

The amount of precursor solution solvent (9) present in the precursor solution (5) depends on the method in which it is processed. Next, two examples of methods for processing the precursor solution (5) are described.

In method A, the gelatin is processed with a liquid solvent excess to obtain a homogeneous solution. This solution is applied on the surface to be protected. When the lattice of the gelatin and solvent evaporation occur, a uniform coating is obtained. It has the advantage of being able to be readily carried out at room temperature, although it requires long drying times.

In method B, the gelatin is processed at a high temperature, ca. 80° C., with the minimum solvent needed. Upon applying this hot solution on a cold surface, a homogeneous coating is created.

Preferably, the method of processing the precursor solution (5) is method B, since process times are successfully reduced.

In a preferred embodiment, the precursor solution (5) is a solution of gelatin of collagen in water to be applied hot. This solution can include an agent that increases the mobility of the active ingredient in the coating. Preferably, this agent is glycerine since it is compatible with gelatin and non-toxic.

The precursor solution can contain the active ingredient (4). In this case, an active coating (1) is produced. This has the advantage of directly forming the active coating that protects the surface.

Alternatively, the precursor solution (5) does not contain the active ingredient (4), thus producing an inactive coating (1). Once the coating (1) is formed, it is loaded by means of applying the loading solution (3). Coatings with a higher concentration of active ingredient on the surface, resulting in higher effectiveness, are thereby obtained.

Base Substrate (11)

A method of applying at least the base matrix (2) of the coating other than the precursor solution (5) is by means of a base substrate (11).

The objective of this preferred embodiment is to generate a self-disinfecting coating (1) in the form of a rigid or flexible sheet.

To achieve this, the base matrix (2) is infused into an absorbent material or base substrate (11) to confer the self-disinfecting properties to said base substrate (11). The base substrate (11) can be a fabric, a paper, or any porous surface.

A sheet which can be transported and used in the required place is thereby achieved, preventing the phase of applying the coating. This sheet can be used as a safe working base in laboratories, or for example as a tablecloth or covering for tables exposed to frequent contacts. Covers for doorknobs, grips, etc. can also be made.

The base matrix (2) that is applied on the base substrate (11) can be formulated with a limited amount of plasticising agent (6) to form a rigid material, even though the base substrate (11) is flexible.

Alternatively, the base matrix (2) that is applied on the base substrate (11) can be formulated with sufficient plasticiser that it allows flexibility in the deformation of the original base substrate (11).

Preferred Embodiments of the Invention

Self-Disinfecting Coating

Percentages (%) herein express mass ratios.

In a preferred embodiment, the gel matrix is used to prepare coatings with self-disinfecting properties.

In this exemplary embodiment, the coating (1) is performed with a base matrix (2) including collagen as the gel base (10), the gel fluid (7) is mostly water, and it includes glycerine as the plasticising agent (6). The active ingredient (4) of the active matrix (1) is elemental iodine.

This base matrix is prepared by means of a precursor solution (5) including a solution of collagen in water, glycerine as the plasticiser (6) and ethanol as the volatile solvent (9).

In this formulation, preferably the glycerine/dry collagen mass ratio is between 5/100 and 30/100. Even more preferably, the glycerine/dry collagen mass ratio is 15/100.

The water/dry collagen mass ratio is between 30/100 and 70/100, preferably 50/100.

The amount of ethanol as the solvent volatile (9) is initially at a mass percentage in a range of 2 to 20%, preferably 8 to 12%.

Preferably this solution includes a dye. Preferably this dye is blue.

This low-viscosity precursor solution (5) is preferably applied on the surface to be protected by means of hot aerosol at a temperature exceeding 60° C. It can alternatively be applied by means of brushes and rollers. It fixes rapidly upon contact with the cold surface, which allows obtaining thick coatings. Thicker coatings can be obtained by applying several layers.

The loading solution (3) comprises a solution of iodine in ethanol. Preferably the ethanol is 96° ethanol. The iodine is at a concentration of 0.5 to 20% by mass. Preferably the concentration of iodine is of 1%.

The loading solution (3) is preferably applied on the base matrix coating (2) to obtain an active matrix coating (1). The loading solution (3) can be prepared in different ways.

Preferably, the loading solution is applied by means of an aerosol. If the base matrix is blue, then the active matrix is green.

After 24 hours, the green colour turns bluish-green. Preferably at this point, which indicates that there is still a sufficient concentration of iodine, the 1% loading solution is reapplied. If more concentrated loading solutions are applied, for example, 15% solutions, the loads can be spaced out farther, for example, every 72 h.

Self-Disinfecting Sheet

In a preferred embodiment, the base matrix (2) is impregnated in a base substrate to prepare sheets or fabrics with self-disinfecting properties. The result can be rigid sheets or fabrics, depending on the formulation.

The feature of this embodiment is the location of the matrix in a base substrate (11) such as, for example, cellulose paper, natural fabric or synthetic fabrics. Preferably base substrates (11) having good affinity with the base matrix (2) are used. Preferably, the matrix includes collagen as the gel base (10), water as the main component of the gel fluid (7), glycerine as the plasticising agent (6) and iodine as the active ingredient (4).

In this formulation, preferably the glycerine/dry collagen mass ratio is between 0.5/100 and 15/100. Even more preferably, the glycerine/dry collagen mass ratio is 7/100.

SPECIFIC EXAMPLES

Example 1. Preparation of a Precursor Solution (5)

In a preferred embodiment, 21 g of gelatin of collagen are hydrated in cold distilled water until obtaining an approximate hydrated weight of 60 g. The drained gel mass is heated to a temperature of 80° C. until a homogeneous melt. Temperature is reduced to 60° C., and 6 g of 96° ethanol are added under stirring to obtain a solution of collagen with ethanol.

In another container, 6 g of glycerine, which acts as the plasticiser (6), 2 g of titanium dioxide and 0.15 g of concentrated universal 403 blue dye are mixed until obtaining a blue paste without the presence of clumping. The blue paste is added to the solution of collagen with ethanol, maintaining 60° C. under constant stirring. Lastly, 0.05 g of Acticide MBR 1 are added to obtain a viscous blue precursor solution (5).

Example 2. Preparation of a Loading Solution (3)

1 g of elemental iodine, the agent active (4) in this embodiment, is dissolved in 99 g of ethanol/water at a 96/4 volume ratio, the solvent (7), by means of stirring at room temperature. This produces a solution with a clear ochre yellow colour.

This loading solution based on elemental iodine can be prepared in a more concentrated form, including up to 20 g in 80 g of ethanol.

Example 3. Preparation of an Inactive Coating (2)

The solution prepared in Example 1 is used to coat a white PVC surface. The viscous liquid solution of this example is applied at 60° C. on the surface by means of a brush. After a 10-minute cooling and evaporation period, a blue coating dry to the touch is formed.

Example 4. Preparation of an Active Coating (1)

An active coating (1) is prepared by means of applying a loading solution (3) on an inactive coating (1). Dispersion is performed on the blue inactive coating (1) prepared in Example 3 by means of an aerosol of the yellowish loading solution (3) prepared in Example 2. The correct spread of the active ingredient (4) can be observed by the green colour of the active coating (1) obtained. Five minutes after applying, the coating is dry to the touch.

24 h after applying a loading solution (3), the colour of the coating (1) is bluish green. This is a suitable point for applying loading solution (3) again. If it is not loaded, the colour of the coating goes back to the original blue colour 72 h later, indicating that the coating (1) is inactive. At this point, an application of the loading solution of the example (3) reactivates the coating (1) and confers a green colour to same.

Disinfectant efficacy tests are performed on this reactivated film. A sample with daily microbial contamination is applied on the white PVC surface and on the active coating (1).

Example 5. Preparation of a Loading Solution (3)

20 g of elemental iodine, the agent active (4) in this embodiment, is dissolved in 80 g of ethanol/water at a 96/4 volume ratio, the solvent (7), by means of stirring at room temperature. This produces a solution with a clear ochre brown colour and noticeable smell of iodine.

The invention claimed is:

1. A self-disinfecting coating for surfaces comprising:
   a base matrix comprising
   a gel base,
   a gel fluid; and
   a loading solution comprising
   an active disinfectant ingredient,
   in such a way that the base matrix is able to absorb and retain the active disinfectant ingredient while maintaining, on a free surface of the coating, a sufficient concentration of the active disinfectant ingredient, thus maintaining the surface disinfected; the base matrix comprising a plasticising agent, the mass ratio between the plasticising agent and the gel base being between 5/100 and 30/100.

2. The self-disinfecting coating for surfaces according to claim 1, wherein the gel base is a protein selected from the group consisting of collagen, albumin, and elastin.

3. The self-disinfecting coating for surfaces according to claim 1, wherein the gel base comprises a polymer or copolymer based on vinyl alcohol or acrylic acid monomers and derivatives thereof.

4. The self-disinfecting coating for surfaces according to claim 1, wherein the gel base comprises a polysaccharide.

5. The self-disinfecting coating for surfaces according to claim 1, wherein the plasticising agent comprises glycerine.

6. The self-disinfecting coating for surfaces according to claim 1, wherein the active disinfectant ingredient is an oxidiser.

7. The self-disinfecting coating for surfaces according to claim 6, wherein the active disinfectant ingredient comprises a peroxide selected from the selected from the group consisting of hydrogen peroxide, organic peroxides and organic peracids.

8. The self-disinfecting coating for surfaces according to claim 7, wherein the active disinfectant ingredient comprises a halogen or a halogen derivative.

9. The self-disinfecting coating for surfaces according to claim 8, wherein the halogen or halogen derivative of the active disinfectant ingredient is selected from the group consisting of chlorine, hypochlorite, bromide, and hypobromite.

10. The self-disinfecting coating for surfaces according to claim 7, wherein the active disinfectant ingredient comprises elemental iodine.

11. The self-disinfecting coating for surfaces according to claim 1, wherein the loading solution comprises ethanol as the loading solvent.

12. The self-disinfecting coating for surfaces according to claim 11, wherein the loading solution comprises a solution between 0.5 and 20% by mass of elemental iodine in ethanol.

13. The self-disinfecting coating for surfaces according to claim 1, wherein the active disinfectant ingredient has a different color with respect to the gel base which allows visual identification of high concentrations of the active disinfectant ingredient on the surface of the coating.

14. The self-disinfecting coating for surfaces according to claim 13, wherein the gel base comprises a dye which improves the visual differentiation of high concentrations of the active disinfectant ingredient from low concentrations of the active disinfectant ingredient on the surface of the coating.

15. The self-disinfecting coating for surfaces according to claim 14, wherein the dye of the gel base is blue.

16. The self-disinfecting coating for surfaces according to claim 1, wherein at least the base matrix is in the form of a precursor solution in liquid state comprising the gel base and a precursor solution solvent such that the coating can be applied on a surface by means of an aerosol, and when the precursor solution solvent disappears, the coating adopts the solid state.

17. A self-disinfecting coating for surfaces comprising:
a base matrix comprising
a gel base,
a gel fluid; and
a loading solution comprising
an active disinfectant ingredient,
in such a way that the base matrix is able to absorb and retain the active disinfectant ingredient while maintaining, on a free surface of the coating, a sufficient concentration of active disinfectant ingredient, thus maintaining the surface disinfected;
wherein the loading solution comprises ethanol as the loading solvent, the loading solution comprising a solution between 0.5 and 20% by mass of elemental iodine in ethanol.

18. A self-disinfecting coating for surfaces comprising:
a base matrix comprising
a gel base,
a gel fluid; and
a loading solution comprising
an active disinfectant ingredient,
in such a way that the base matrix is able to absorb and retain the active disinfectant ingredient while maintaining, on a free surface of the coating, a sufficient concentration of active disinfectant ingredient, thus maintaining the surface disinfected;
wherein the active disinfectant ingredient has a different color with respect to the gel base which allows visual identification of high concentrations of the active disinfectant ingredient on the surface of the coating, the gel base comprising a dye which improves the visual differentiation of high concentrations of the active disinfectant ingredient from low concentrations of the active disinfectant ingredient on the surface of the coating, the dye of the gel base being blue.

* * * * *